Patented Mar. 4, 1930

1,749,712

UNITED STATES PATENT OFFICE

GILBERT MICHEL, OF BAGNEUX, FRANCE, ASSIGNOR TO HART O. BERG, OF PARIS, FRANCE

PROCESS FOR AUTOGENOUS WELDING OF MAGNESIUM AND ITS ALLOYS

No Drawing. Application filed February 5, 1925, Serial No. 7,158, and in France December 23, 1924.

In the autogenous welding process as applied to certain metals, and chiefly to aluminium, suitable powdered substances are in current use which serve simultaneously as a flux, a de-oxidizing substance and as a cleaning substance.

The action of the blowpipe flame and the temperature of the same have the effect of producing the rapid oxidation of the surfaces to be welded and of the additional metal, by the formation of a surface film which film has a much higher melting point than the metal itself.

The powders employed in the case of aluminium, which are very effective, consist as a rule of mixtures of alkaline carbonates and of fluxes in variable proportions.

A powder made up according to the following formula is commonly and successfully used in welding aluminum:

|  | Parts |
|---|---|
| Lithium chloride | 15 |
| Potassium chloride | 45 |
| Sodium chloride | 30 |
| Potassium fluoride | 7 |
| Potassium bisulphate | 3 |
|  | 100 |

The powders which serve to advantage in the autogenous welding of aluminium will not however afford satisfactory results in the case of magnesium and other metals and alloys which are, like magnesium, very easily oxidizable.

The expression "metal having a substantial magnesium content" used hereinafter, is intended to cover both pure magnesium and alloys in which magnesium is a substantial constituent. It has heretofore not been possible to autogenously weld such materials, in a satisfactory manner.

Under the action of the blowpipe, the alkali chlorides used in the said powders will form with the metal a series of oxychlorides which result in future deterioration of the metal.

The melting point of the said chlorides is higher than that of the magnesium, so that it is the usual practice to prolong the action of the blowpipe, but this will partially volatilize the magnesium.

The present invention has for its object to modify the composition of the welding powders in current use (for example the one containing lithium chlorid, above given), by the addition of suitable substances in the proper proportions, whereby the same shall be adapted for the autogenous welding of magnesium. It consists essentially in adding to the known mixtures, and especially to those containing from 8 to 15 per cent by weight of lithium chloride, firstly a reducing salt such as ammonium chloride, and secondly a substance which serves both as a flux and as a de-chlorinating agent, such as magnesium fluoride. These two salts may be added to the mixture in variable proportions, but I find that the proportions which give the best results are as follows:

Magnesium fluoride, 8 to 15 per cent of the total mixture.

Ammonium chloride, 10 to 35 per cent of the total mixture.

Thus with the specific composition above described by way of example, there may be used 50 to 78% of a mixture of lithium chloride, 15 parts; potassium chloride, 45 parts; sodium chloride, 30 parts; potassium fluoride, 7 parts; potassium bisulphate, 3 parts; and 8 to 15% of ammonium chloride and 10 to 35% of magnesium fluoride.

I prefer to employ these two substances by mixing them at the time of use with a powder which is suitable for the welding of aluminium, but they may also be added to other known welding powders which are adapted for immediate use and particularly such as are used for welding aluminum. The magnesium fluoride serves as a flux, and it forms at the surface of the part acted upon by the blowpipe a layer or film of a fluid nature which is constantly interposed between the oxidizing and carburetting end of the blowpipe flame and the melted metal. In this manner all excessive oxidation of the magnesium is obviated, and furthermore, due to the presence of the said film, the chlorides and oxychlorides entering into the composition of the welding substance will be prevented from dissolving or diffusing into the metallic mass.

The ammonium chloride which is added will serve as a reducing agent, thus preventing all excessive oxidation of the metal and reducing any oxides which might be formed as soon as they are produced.

It is worthy of note that the residues which are left after the welding operation, when the magnesium fluoride is used as a flux and the ammonium chloride as a reducing agent, are soluble in water, so that the welded part can be readily cleaned and all chlorides which may adhere to the metal can be removed by treatment with water, after the welding operation.

By the said process, I am enabled to perform the autogenous welding of pieces of magnesium which could not be so welded by the methods commonly used with aluminum and like metals. In fact, the attempts which have hitherto been made for the autogenous welding of magnesium and its alloys consisted in employing the means in general use for the welding of aluminium and without any essential modification, but, firstly, it is necessary to prolong the action of the blowpipe in order to melt the crust which is formed by the oxides and oxychlorides at the surface of the metal and secondly magnesium oxide and oxychlorides are formed within the metal itself and thirdly a part of the chlorides of the welding substance will be diffused into the metal, and for these three reasons the welded portion of the metal pieces thus treated shows a physico-chemical composition of a most defective nature and quite different from that of the untreated metal, thus causing a serious lack of homogeneity in the welded pieces and an unstable condition which is due to the addition of prejudicial substances. For these reasons, the welding thus performed will not show practical results such as would adapt it for manufacturing purposes.

My said process is not attended with any such inconvenience, but the welded part of the metal is now in a perfectly sound condition.

Obviously, the said invention covers not only the mixtures containing various proportions of magnesium fluoride and ammonium chloride, but also mixtures wherein these salts are replaced by other salts of a chemically equivalent nature; the invention further covers modifications in which only one of the two salts is employed.

My invention is hereinbefore described with reference to magnesium but it is to be understood that it is also suitable for magnesium alloys and any other readily oxidizable metal and their alloys.

I claim:—

1. A process of welding magnesium and its alloys, consisting in heating the parts to be welded to a welding temperature, applying to the heated parts substances of the general character of those used in the autogenous welding of aluminum, and also a fluoride which acts as both a flux and dechlorinating agent, together with a substance acting as a reducing agent.

2. A process of welding magnesium and its alloys, consisting in heating the parts to be welded to a welding temperature, applying to the heated parts substances of the general character of those used in the autogenous welding of aluminum and also magnesium fluoride and an ammonium compound capable of acting as a reducing agent.

3. A process of welding magnesium and its alloys, consisting in heating the parts to be welded to a welding temperature, applying to the heated parts, substances of the general character of those used in the autogenous welding of aluminum and also a dechlorinating agent and ammonium chloride.

4. A process of welding magnesium and its alloys, consisting in heating the parts to be welded to a welding temperature and applying thereto substances of the general character of those used in the autogenous welding of aluminum and also magnesium fluoride and ammonium chloride.

5. A process of welding magnesium and its alloys, consisting in heating the parts to be welded, applying thereto substances of the general character of those used in the autogenous welding of aluminum, mixed with 8 to 15 per cent of magnesium fluoride and 10 to 55 per cent of ammonium chloride.

6. In the process of welding magnesium and its alloys, the herein described step of applying thereto at the time of heating the metal to a welding temperature, a welding composition comprising ammonium chloride and magnesium fluoride.

7. In the process of welding magnesium and its alloys, the herein described step of applying thereto at the time of heating such metal to a welding temperature, a welding composition comprising ammonium chloride, magnesium fluoride and lithium chloride.

8. A composition suitable for use in welding magnesium which comprises a flux suitable for use in welding aluminum, together with magnesium fluoride and ammonium chloride.

9. A composition suitable for use in welding magnesium which comprises a flux suitable for use in welding aluminum, together with magnesium fluoride and a salt capable of acting as a reducing agent.

10. A composition suitable as a welding composition for use in welding magnesium metal, such composition comprising lithium, potassium and sodium chlorides, potassium fluoride, alkali metal bisulfate, magnesium fluoride and ammonium chloride.

11. A welding composition suitable for use in welding magnesium comprising ammonium chloride and magnesium fluoride.

12. A composition suitable for use in welding magnesium which comprises a flux suitable for use in welding aluminum, together with about 8 to 15 per cent magnesium fluoride and 10 to 35 per cent ammonium chloride.

13. A composition suitable as a welding composition for use in welding magnesium metal, such composition comprising lithium, potassium and sodium chlorides, potassium fluoride, alkali metal bisulfate, about 8 to 15 per cent magnesium fluoride and 10 to 35 per cent ammonium chloride.

14. A composition suitable for use in the autogenous welding of magnesium, comprising in part a powder having as its principal elements about 15% lithium chloride and 75% potassium and sodium chlorides and in part magnesium fluoride and ammonium chloride.

15. A composition suitable for use in welding magnesium comprising in part a powder suitable for use in welding aluminum and having as principal elements about 15% lithium chloride and 75% potassium and sodium chlorides and the entire composition also containing 8 to 15 per cent magnesium fluoride and 10 to 35% ammonium chloride.

In testimony whereof I have signed my name to this specification.

GILBERT MICHEL.